(No Model.)
A. H. OVERMAN & C. F. HADLEY.
VELOCIPEDE WHEEL.
No. 283,413. Patented Aug. 21, 1883.
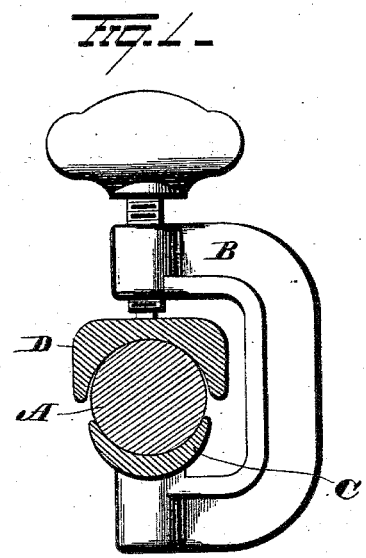
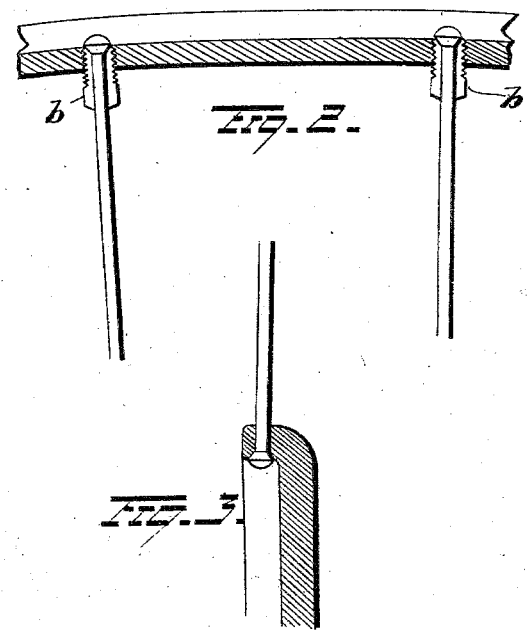
WITNESSES
INVENTORS
Attorney

UNITED STATES PATENT OFFICE.

ALBERT H. OVERMAN AND CHARLES F. HADLEY, OF CHICOPEE, MASSACHUSETTS, ASSIGNORS TO THE OVERMAN WHEEL COMPANY, OF HARTFORD, CONNECTICUT.

VELOCIPEDE-WHEEL.

SPECIFICATION forming part of Letters Patent No. 283,413, dated August 21, 1883.

Application filed May 16, 1883. (No model.)

*To all whom it may concern:*

Be it known that we, ALBERT H. OVERMAN and CHARLES F. HADLEY, of Chicopee, in the county of Hampden and State of Massachusetts, have invented certain new and useful Improvements in Velocipedes; and we do hereby declare the following to be a full, clear, and exact description of the invention, such as will enable others skilled in the art to which it appertains to make and use the same.

Our invention relates to an improvement in providing wheels with rubber tires. Heretofore in providing wheels with these tires the latter have always been made somewhat smaller than the distance around the periphery of the wheel, thus necessitating a stretching of the tire. This method is objectionable in that every time the tire receives a cut it always spreads open, thus damaging it to a great extent.

The object of our invention is to provide a wheel with a tire which shall be equal in length to the distance around the periphery, and thus overcome the defect above stated; and with this end in view our invention consists in certain details of construction and combinations of parts, as will be hereinafter explained and pointed out in the claims.

In the accompanying drawings, Figure 1 is a view showing the clamp in position when used to compress the tire in the rim. Fig. 2 is a view in section, showing the manner of securing the spokes to the rim. Fig. 3 is a view showing the manner of securing the spokes to the flange of the hub.

A represents the tire, B the clamp, C the rim or felly of the wheel, and D an inverted rim cut in segments of suitable length and adapted to exactly fit over the rubber tire. The upper surface of this inverted rim is somewhat flattened to allow the screw of the clamp a hold. A cement or its equivalent is spread around on the inner surface of the rim C, and a tire, D, equal in length to the distance around the rim, is placed in it and the segments D of a rim placed over the tire, and the clamp applied to the ends of each segment. These clamps firmly hold the tire in place until it is securely fastened to the rim, after which they are removed together with the segments of the rim. By these means the tire is compressed and is held firmly until the cement is hardened.

Fig. 2 shows the manner of securing the spokes to the rim. Instead of securing the adjusting-nuts $b$ to the flange of the hub, I secure them in the rim, thus avoiding the necessity of displacing the rubber tire when it is desired to remove the spoke.

Our invention is simple, neat, and possesses a great advantage in that the tire will last a greater length of time.

Having fully described our invention, what we claim as new, and desire to secure by Letters Patent, is—

1. The herein-described method of fitting elastic tires upon wheel-rims, the same consisting, first, in applying a cement to the surface of the rim; second, in placing an elastic tire of equal length to the circumference of the rim around the same and upon the cement; third, in placing segments of the configuration of the tire upon it, and in clamping the said segments upon the tire, whereby the tire is held until the cement sets, substantially as specified.

2. The combination, with a wheel having a concave rim, and a rubber tire secured to the rim, of the spokes secured to the hub at one end, and the nuts secured to the other end of the spokes, and screwed into the rim, whereby the spokes are tightened, substantially as shown and described.

In testimony whereof we have signed this specification in the presence of two subscribing witnesses.

ALBERT H. OVERMAN.
CHARLES F. HADLEY.

Witnesses:
ROLAND T. OAKES,
CHAS. L. PEPPER.